(12) United States Patent
Dulot et al.

(10) Patent No.: US 10,711,206 B2
(45) Date of Patent: Jul. 14, 2020

(54) METHOD FOR STARTING UP A METHOD FOR PRODUCING KEROSENE AND DIESEL FUEL FROM HYDROCARBON COMPOUNDS PRODUCED BY FISCHER-TROPSCH SYNTHESIS

(71) Applicant: IFP Energies Nouvelles, Rueil-Malmaison (FR)

(72) Inventors: Hugues Dulot, Rueil-Malmaison (FR); Aline Grezaud, Villeurbanne (FR); Jean-Philippe Heraud, Saint Pierre de Chandieu (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/169,341

(22) Filed: Oct. 24, 2018

(65) Prior Publication Data

US 2019/0119585 A1 Apr. 25, 2019

(30) Foreign Application Priority Data

Oct. 24, 2017 (FR) ...................................... 17 60011

(51) Int. Cl.
*C10G 49/24* (2006.01)
*C10G 65/12* (2006.01)
(Continued)

(52) U.S. Cl.
CPC .............. *C10G 49/24* (2013.01); *B01J 23/42* (2013.01); *B01J 23/883* (2013.01); *B01J 37/18* (2013.01);
(Continued)

(58) Field of Classification Search
CPC ........ C10G 45/08; C10G 47/14; C10G 47/18; C10G 49/24; C10G 65/12; C10G 2300/1022; C10G 2300/4031
See application file for complete search history.

(56) References Cited

U.S. PATENT DOCUMENTS

2004/0072676 A1 4/2004 Bishop et al.
2011/0000822 A1* 1/2011 Domokos .............. B01J 23/883
208/143
(Continued)

FOREIGN PATENT DOCUMENTS

FR 3045654 A1 6/2017

OTHER PUBLICATIONS

Search Report dated May 15, 2018 issued in corresponding FR 1760011 application (2 pages).
English Abstract of FR 3045654 A published Jun. 23, 2017.

*Primary Examiner* — Renee Robinson
(74) *Attorney, Agent, or Firm* — Millen, White, Zelano and Branigan, P.C.

(57) ABSTRACT

Method for starting up a method for producing kerosene and diesel fuel from hydrocarbon compounds produced by Fischer-Tropsch synthesis.
The start-up method employs catalytic reaction of Fischer-Tropsch synthesis with a synthesis gas for producing a heavy hydrocarbon fraction and a light hydrocarbon fraction, a reduction (RE) reducing a hydrotreatment catalyst by ensuring contact with a gas comprising hydrogen, bringing the heavy hydrocarbon fraction into contact with the hydrotreatment catalyst (DM). During the step for ensuring contact, the temperature (TEMP) of the catalyst is increased to a temperature of between 260° C. and 360° C. Then, (TR) bringing a mixture comprising the heavy hydrocarbon frac- (Continued)

tion and the light hydrocarbon fraction into contact with the hydrotreatment catalyst is carried out.

14 Claims, 2 Drawing Sheets

(51) Int. Cl.
| | |
|---|---|
| C10G 45/38 | (2006.01) |
| C10G 45/52 | (2006.01) |
| C10G 45/54 | (2006.01) |
| C10G 2/00 | (2006.01) |
| C10L 1/08 | (2006.01) |
| B01J 23/883 | (2006.01) |
| B01J 37/18 | (2006.01) |
| C10G 45/62 | (2006.01) |
| C10G 45/64 | (2006.01) |
| B01J 23/42 | (2006.01) |
| C10G 47/18 | (2006.01) |
| C10G 45/08 | (2006.01) |
| B01J 21/12 | (2006.01) |

(52) U.S. Cl.
CPC ............... *C10G 2/32* (2013.01); *C10G 45/08* (2013.01); *C10G 45/38* (2013.01); *C10G 45/52* (2013.01); *C10G 45/54* (2013.01); *C10G 45/62* (2013.01); *C10G 45/64* (2013.01); *C10G 47/18* (2013.01); *C10G 65/12* (2013.01); *C10L 1/08* (2013.01); *B01J 21/12* (2013.01); *C10G 2300/1022* (2013.01); *C10G 2300/4031* (2013.01); *C10G 2400/04* (2013.01); *C10G 2400/06* (2013.01); *C10G 2400/08* (2013.01)

(56) References Cited

U.S. PATENT DOCUMENTS

2011/0207978 A1   8/2011   Tanaka et al.
2013/0270153 A1*  10/2013  Heraud .................. C10G 65/12
                                                   208/60

* cited by examiner

METHOD FOR STARTING UP A METHOD FOR PRODUCING KEROSENE AND DIESEL FUEL FROM HYDROCARBON COMPOUNDS PRODUCED BY FISCHER-TROPSCH SYNTHESIS

FIELD OF THE INVENTION

This invention relates to a method for starting up a method for producing kerosene and diesel fuel from hydrocarbon compounds produced by Fischer-Tropsch synthesis.

The object of the invention relates more particularly to the start-up mode of the step for hydrotreatment of hydrocarbon effluents produced by Fischer-Tropsch synthesis.

The Fischer-Tropsch synthesis methods make it possible to obtain a wide range of hydrocarbon products from the mixture of carbon monoxide (CO) and dihydrogen (H2), commonly called synthesis gas. The overall equation of Fischer-Tropsch synthesis can be written in the following manner:

$$nCO + (2n+1)H_2 \rightarrow C_nH_{2n+2} + nH_2O$$

The Fischer-Tropsch synthesis is at the heart of methods for conversion of natural gas, carbon or biomass into fuels or into intermediate compounds for the chemical industry. These methods are called GTL ("Gas to Liquids" according to English terminology) in the case of the use of natural gas as initial feedstock, CTL ("Coal to Liquids" according to English terminology) for carbon, and BTL ("Biomass to Liquids" according to English terminology) for biomass.

In each of these cases, the initial feedstock is first transformed into a synthesis gas that comprises a mixture of carbon monoxide and dihydrogen.

The synthesis gas having an $H_2/CO$ ratio close to 2 is then transformed for the most part into paraffins thanks to Fischer-Tropsch synthesis, and these paraffins can then be transformed into fuels by a method of hydrotreatment and optionally hydroisomerization and hydrocracking. For example, transformation methods such as hydrocracking, dewaxing, and hydroisomerization of heavy fractions (C22+) make it possible to produce different types of fuels within the range of middle distillates: diesel fuel (180-370° C. fraction) and kerosene (140-300° C. fraction). The naphtha fraction (30-140° C. fraction) is generally sent to a steam-cracking unit to produce light olefins useful to the production of plastics, but can also be subjected to catalytic reforming so as to increase the octane number for use in the gasoline pool, and/or it can also be subjected to aromatization so as to produce upgradable aromatic compounds as sources for petrochemistry.

PRIOR ART

The production of synthesis fuels via Fischer-Tropsch synthesis from a feedstock of hydrocarbons of fossil origin and/or of biomass is an alternative to fuels obtained from petroleum for meeting a growing demand for these products.

The steps for hydrotreatment, hydrocracking and hydroisomerization of hydrocarbon effluents produced by the Fischer-Tropsch unit use catalysts based on metals from group VIB and/or VIIIB, such as nickel, molybdenum, tungsten, cobalt, ruthenium. The noble metals such as palladium and platinum are particularly sensitive to poisoning that reduces their catalytic performance. The best known poisons for these catalysts are sulfur, nitrogen or else carbonyl metal compounds, for example carbonyl nickel or carbonyl iron. These pollutants are generally provided by the feedstock. In the case of our invention, with the feedstock being produced by Fischer-Tropsch synthesis, it does not comprise sulfur and nitrogen. Actually, the Fischer-Tropsch catalyst is itself very sensitive to these poisons, and a step for purification of the synthesis gas upstream makes it possible to eliminate poisons such as sulfur and nitrogen.

However, compounds of the carbonyl metal type can appear during the hydrotreatment step and therefore degrade the catalytic performance, taking into account the formulation of the catalyst that can be used for the hydrotreatment, hydrocracking and hydroisomerization of the feedstock combined with specificities of the treated feedstock. Actually, under certain operating conditions and particularly during the start-up phase, the presence of oxidized compounds, in particular carboxylic acids, and an operating temperature lower than 150° C. bring about the formation of carbonyl metals.

Furthermore, the start-up of the hydrotreatment unit requires monitoring of the temperature in the reactors, taking into account the high exothermicity of the reaction for hydrogenation of olefins into paraffins in the hydrotreatment reactors so as to prevent superheating that would bring about degradations of catalysts and a reduction in performance.

The patent EP2351819 describes the start-up of a unit for hydrotreatment of the naphtha fraction produced by Fischer-Tropsch synthesis. This patent describes the use of an inactive solvent in the start-up to be mixed with the naphtha produced by Fischer-Tropsch synthesis in such a way as to monitor the reaction heat released by the hydrogenation of olefins. However, the method described by the patent EP2351819 provides that the entire naphtha feedstock obtained from the Fischer-Tropsch synthesis unit be sent to the hydrotreatment unit during the start-up, which can, taking into account prevailing temperatures, generate the formation of carbonyl metals and therefore runs the risk of poisoning the catalyst.

This invention proposes carrying out the operation of the start-up phase of the hydrotreatment step with a monitored injection sequence of the feedstock and a rise in temperature that is gradual and different from the operation in the production phase of the hydrotreatment steps. The production phase that is optimized to produce the desired products can also be named nominal operating mode or steady-state operating mode. The operating conditions in the startup phase according to the invention are selected to limit and even to prevent the formation of compounds of carbonyl metal type, while controlling the rise in temperature of the hydrotreatment catalyst during the start-up phase.

BRIEF DESCRIPTION OF THE INVENTION

This invention relates to a method for starting up a method for producing kerosene and diesel fuel from hydrocarbon compounds produced by Fischer-Tropsch synthesis, in which the following steps are carried out:

a) A catalytic reaction of Fischer-Tropsch synthesis is carried out with a synthesis gas to produce a heavy hydrocarbon fraction and a light hydrocarbon fraction, b) A reduction of a hydrotreatment catalyst is carried out by ensuring contact with a gas comprising hydrogen, and then step c) is carried out, c) The heavy hydrocarbon fraction is brought into contact with the hydrotreatment catalyst, d) During step c), the temperature of the hydrotreatment catalyst is increased to a temperature of between 260° C. and 360° C., and then step e) is carried out, e) A mixture comprising the heavy hydrocarbon fraction and the light hydrocarbon fraction is brought into contact with the hydrotreatment catalyst.

According to the invention, in step b), it is possible to carry out a reduction of the hydrotreatment catalyst and of a hydrocracking and hydroisomerization catalyst by ensuring contact with a gas comprising hydrogen, and then step c) is carried out, in step c), it is possible to bring the heavy hydrocarbon fraction into contact with the hydrotreatment catalyst and then with the hydrocracking and hydroisomerization catalyst, in step e), it is possible to bring the mixture comprising the heavy hydrocarbon fraction and the light hydrocarbon fraction into contact with the hydrotreatment catalyst and then with the hydrocracking and hydroisomerization catalyst.

It is possible to carry out step b) at a temperature of between 300° C. and 500° C., and then it is possible to cool the hydrotreatment catalyst to a temperature of between 120° C. and 170° C., and then it is possible to carry out step c).

According to the invention, at the beginning of step d), the heavy hydrocarbon fraction can be at a temperature of between 100° C. and 250° C., and in step d), it is possible to heat the heavy hydrocarbon fraction gradually for a period of between 1 and 20 hours up to a temperature of between 260° C. and 360° C.

According to the invention, in step e), it is possible to mix the light fraction gradually with the heavy fraction, with the light fraction part introduced into the mixture being increased from 0% to 100% by volume of the light fraction obtained from step a), over a period of between 1 and 20 hours.

During step c), the light hydrocarbon fraction can be evacuated from the start-up method. In other words, during step c), the light hydrocarbon fraction is not used for being brought into contact with the hydrotreatment catalyst.

The hydrotreatment catalyst can comprise at least one metal selected from group VIIIB and group VIB, and at least one substrate. Preferably, the hydrotreatment catalyst comprises molybdenum and nickel, and a substrate comprising alumina.

The hydrocracking and hydroisomerization catalyst can comprise at least one metal selected from group VIIIB and group VIB, and at least one substrate. Preferably, the hydrocracking and hydroisomerization catalyst can comprise platinum and a substrate selected from among silica-alumina and a zeolite.

According to the invention, step a) can be carried out, in the presence of a catalyst comprising a substrate and a metal selected from among cobalt and iron, at a total pressure of between 0.1 and 15 MPa, at a temperature of between 150 and 350° C., and at an hourly volumetric flow rate of between 100 and 20,000 volumes of synthesis gas per volume of catalyst and per hour.

According to the invention, it is possible to carry out step f):

f) After step e), the mixture comprising the heavy hydrocarbon fraction and the light hydrocarbon fraction continues to be brought into contact with the hydrotreatment catalyst under the operating conditions for producing kerosene and diesel fuel.

It is possible to carry out the contact with the hydrotreatment catalyst in step f) under the following operating conditions:

A temperature of between 100 and 450° C.,

A total pressure of between 0.5 and 15 MPa,

A hydrogen flow rate such that the volumetric ratio of hydrogen in relation to the hydrocarbon feedstock—i.e., the mixture of the heavy and light hydrocarbon fractions—is between 100 to 3,000 Nl/l/h, An hourly volumetric flow rate of between 0.1 and 10 $h^{-1}$.

According to the invention, in step f), it is possible to continue to bring the mixture comprising the heavy hydrocarbon fraction and the light hydrocarbon fraction into contact with the hydrotreatment catalyst and then with the hydrocracking and hydroisomerization catalyst, with the contact with the hydrocracking and hydroisomerization catalyst being carried out under the following operating conditions:

A temperature of between 200 and 450° C.,

A total pressure of between 0.2 and 15 MPa,

A hydrogen flow rate such that the volumetric ratio of hydrogen in relation to the hydrocarbon feedstock—i.e., the mixture of heavy and light hydrocarbon fractions—is between 100 to 2,000 Nl/l/h, An hourly volumetric flow rate is encompassed between 0.1 and 10 $h^{-1}$.

DETAILED DESCRIPTION OF THE INVENTION

Figure 1:
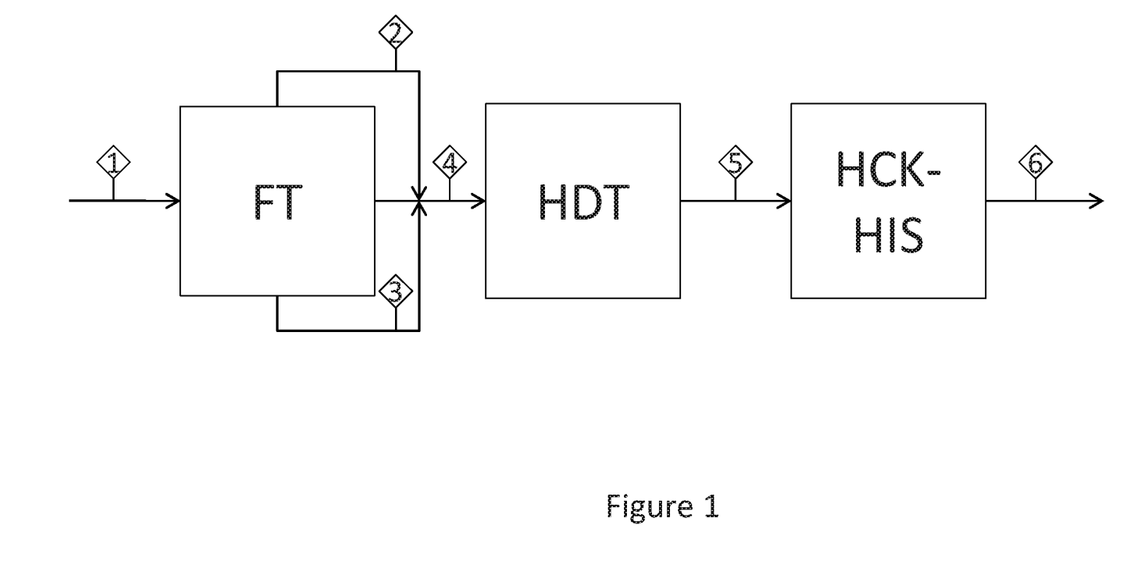
Figure 2:
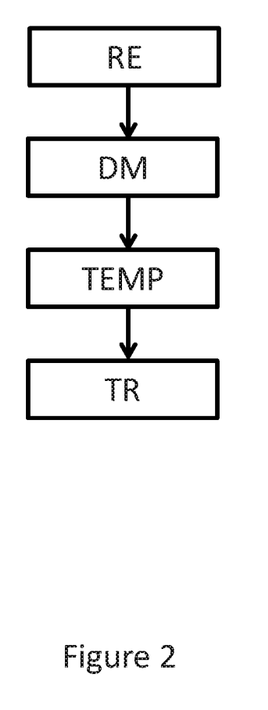

The method for producing kerosene and diesel fuel is illustrated by FIG. 1. The start-up method for producing kerosene and diesel fuel is illustrated by FIG. 2.

With reference to FIG. 1, the method for producing kerosene and diesel fuel uses at least one Fischer-Tropsch synthesis step FT, a hydrotreatment step HDT, and optionally a hydrocracking and hydroisomerization step HCK-HIS. The operating conditions of the production phase are described below with reference to FIG. 1.

The method for starting up the method for producing kerosene and diesel fuel from hydrocarbon compounds produced by Fischer-Tropsch synthesis, according to this invention, is described in detail subsequently with reference to FIG. 2.

Catalytic Reaction Step of Fischer-Tropsch Synthesis FT

The Fischer-Tropsch synthesis step FT makes it possible to produce synthetic hydrocarbons from a gaseous feedstock composed for the most part of hydrogen and carbon monoxide, also called synthesis gas coming in via the pipe 1.

The synthesis gas coming in via the pipe 1 can be produced from a hydrocarbon feedstock of fossil origin and/or biomass. The feedstock can be a gas, solid, or liquid feedstock or mixture thereof.

Hydrocarbon feedstock of fossil origin means a feedstock containing natural gas, carbon, petroleum coke (petcoke according to English terminology), petroleum waste, crude oils, topped crude oils, deasphalted oils, deasphalting asphalts, derivatives of petroleum conversion methods (such as, for example, the heavy fractions of a fluidized-bed catalytic cracking method (FCC for Fluid Catalytic Cracking according to English terminology), the heavy fractions of a decoking method, waste from visbreaking or a similar thermal method), bituminous sand or derivatives thereof, shale gas and bituminous shale or derivatives thereof, by themselves or in a mixture.

Biomass is defined as any type of biomass, solid or liquid, and in particular lignocellulosic-type biomass. Non-limiting examples of biomass types involve, for example, waste from agricultural operations (in particular straw, corn stalks), waste from forestry operations, products from forestry operations, waste from saw mills, dedicated crops, for example short-rotation coppice. Biomass also means liquid biomass (such as, for example: canola oil, palm oil, pyrolysis oil, . . . ), or the slurry biomass according to English terminology corresponding to a mixture of liquid biomass with a solid hydrocarbon feedstock. In the case of a feedstock comprising biomass, the latter can be subjected to a pretreatment comprising steps for drying, roasting, granulation, and grinding.

Preferably, the feedstock is selected from among natural gas, carbon, petroleum coke and/or biomass.

The synthesis gas that comes in via the pipe 1 is introduced in the Fischer-Tropsch step FT of the Fischer-Tropsch synthesis catalytic reaction.

In an advantageous manner, the synthesis gas coming in via the pipe 1 comprises carbon monoxide and hydrogen with an $H_2$/CO molar ratio of between 1 and 3, in a preferred manner between 1.5 and 2.5. Furthermore, the synthesis gas can have a sulfur content of less than 100 ppb by volume, preferably less than 50 ppb by volume, in a more preferred manner less than 10 ppb by volume; an HCN content of less than 100 ppb by volume, preferably less than 50 ppb by volume, in a more preferred manner less than 10 ppb by volume; and an $NH_3$ content of less than 100 ppm by volume, preferably less than 10 ppm by volume, in a more preferred manner less than 1 ppm by volume. The document FR 3045654 describes steps for producing a synthesis gas.

According to the invention, a Fischer-Tropsch synthesis catalytic reaction is carried out, during the Fischer-Tropsch step FT, with a synthesis gas, coming in via the pipe 1, to produce a heavy hydrocarbon fraction, evacuated via the pipe 3, and a light hydrocarbon fraction, evacuated via the pipe 2. In general, the light fraction, also called condensate, corresponds to hydrocarbons in the gaseous state under the conditions of the Fischer-Tropsch reaction, and the heavy fraction, called wax, corresponds to the hydrocarbons in the liquid state under the conditions of the Fischer-Tropsch reaction. The conditions of the Fischer-Tropsch reaction are presented in detail below.

The Fischer-Tropsch synthesis step FT is carried out under a total pressure of between 0.1 and 15 MPa, preferably between 0.5 and 10 MPa, and under a temperature of between 150 and 350° C., preferably between 180 and 270° C. The hourly volumetric flow rate is advantageously between 100 and 20,000 volumes of synthesis gas per volume of catalyst and per hour (100 to 20,000 $h^{-1}$), and preferably between 400 and 10,000 volumes of synthesis gas per volume of catalyst and per hour (400 to 10,000 $h^{-1}$).

The Fischer-Tropsch synthesis step FT can be implemented in a reaction unit comprising one or more suitable reactors, whose technology is known to one skilled in the art. It can involve, for example, multi-tubular fixed-bed reactors, or bubble-column-type reactors, known in English under the name of "slurry bubble column," or microchannel reactors.

According to a preferred mode of the invention, the Fischer-Tropsch step FT implements one or more bubble-column-type reactors. With the synthesis being greatly exothermic, this embodiment makes it possible, i.a., to improve the thermal monitoring of the reactor and to create very few pressure drops.

During use in a bubble-column-type reactor, the size of the catalyst particles is generally between 10 and 500 micrometers (m), in a preferred manner between 10 and 300 µm, and in a very preferred manner between 20 and 150 µm, and in an even more preferred manner between 20 and 120 µm.

The catalyst used in this Fischer-Tropsch synthesis step FT is generally any catalytic solid known to one skilled in the art making it possible to carry out the Fischer-Tropsch synthesis. Preferably, the catalyst used in said step is a substrate catalyst and comprises an active phase comprising cobalt or iron. In a very preferred manner, said active phase comprises cobalt; preferably, the active phase consists of cobalt.

The content of cobalt or iron is between 1 and 60% by weight in relation to the weight of catalyst, preferably 5 to 30% by weight, and in a very preferred manner from 10 to 30% by weight.

The catalyst can advantageously also comprise at least one dopant selected from among boron, phosphorus, a noble metal of groups VIIB or VIIIB, an alkaline element (element of group IA) or an alkaline-earth element (element of group IIA).

In the case where the dopant is selected from among a noble metal of group VIIIB, it is preferably selected from among platinum (Pt), palladium (Pd), rhodium (Rh).

In the case where the dopant is selected from among an alkaline element or an alkaline-earth element, it is preferably selected from among potassium (K), sodium (Na), magnesium (Mg), or calcium (Ca).

The catalyst used in the Fischer-Tropsch step FT is generally a substrate catalyst. The substrate can be, by way of example, based on alumina, silica, or titanium. It can also contain a spinel. In a preferred manner, it is based on a silica-alumina optionally containing a spinel phase.

The Fischer-Tropsch synthesis step makes it possible to produce at least two fractions: a heavy hydrocarbon fraction, evacuated via the pipe 3, and a light hydrocarbon fraction, evacuated via the pipe 2.

The heavy fraction is in general obtained in liquid form under the operating conditions (temperature and pressure) of the Fischer-Tropsch synthesis reaction. The hydrocarbons of the heavy hydrocarbon fraction can have an initial boiling point that is equal to a temperature of between 120 and 300° C. and preferably between 130 and 180° C. and in an even more preferred manner to a temperature of approximately 150° C.; in other words, the initial fraction point is between 120 and 300° C.

The light fraction consists of at least a part of the hydrocarbons obtained in gaseous form under the operating conditions (temperature and pressure) of the Fischer-Tropsch synthesis reaction. The hydrocarbons of the light hydrocarbon fraction can have a final boiling point equal to a temperature of between 120 and 300° C. and preferably between 130 and 180° C., and in an even more preferred manner to a temperature of approximately 150° C. For example, the hydrocarbons of the light hydrocarbon fraction can have a final boiling point equal to the initial boiling point of the heavy hydrocarbon fraction.

More specifically, the gas fraction obtained from the Fischer-Tropsch synthesis is separated into three phases, the aqueous phase produced during the Fischer-Tropsch reaction, the gas phase that contains unconverted synthesis gas, as well as the lightest (C4−) hydrocarbons formed during the Fischer-Tropsch synthesis and the liquid hydrocarbon phase that contains the C5+ hydrocarbons. This liquid hydrocarbon phase containing the C5+ corresponds to the light hydrocarbon fraction. This separation can be carried out by methods that are well known to one skilled in the art, in particular by a cooling step followed by a flash-separation and/or decanting.

The synthetic hydrocarbons produced by the Fischer-Tropsch synthesis step FT are for the most part composed of paraffins but also contain olefins and oxidized compounds. In the light hydrocarbon fraction, the paraffin content is greater than 70% by weight in relation to the total mass of the light fraction, the content of olefins is less than 20% by weight, and the content of oxidized compounds is less than 10% by weight. In the heavy hydrocarbon fraction, the paraffin content is greater than 80% by weight in relation to the total mass of the heavy fraction, the olefin content is less than 15% by weight, and the oxidized compound content is less than 5% by weight.

These synthetic hydrocarbons cannot be incorporated directly into conventional fuel "pools" or cannot be used as lubricants. By way of example, the heavy hydrocarbon fraction comprises C20+. However, the pour point of one paraffin with 20 carbon atoms having a boiling point at 340° C. is approximately 37° C., which makes its direct incorporation into the diesel fuel fraction impossible taking into account the required specification of −15° C. Treatment steps are necessary so as to convert the olefinic and oxidized compounds into paraffin compounds, to convert the heaviest compounds (C22+) into lighter compounds, and thus to increase the middle distillate yield and to improve the properties of kerosene and diesel fuel fractions so as to comply with the specifications required for fuels.

The method according to the invention proposes, when the method operates in the production phase, i.e., in nominal operating mode after the start-up phase, to treat simultaneously the heavy hydrocarbon fraction and the light hydrocarbon fraction obtained from the Fischer-Tropsch unit in the presence of hydrogen in a hydrotreatment step optionally followed by a hydrocracking and hydroisomerization step.

The light hydrocarbon fraction and the heavy hydrocarbon fraction are assembled and sent via the pipe 4 into the hydrotreatment step HDT.

Hydrotreatment Step

According to the invention, a step HDT for hydrotreatment of the heavy and light hydrocarbon fractions obtained from the Fischer-Tropsch synthesis step is carried out.

This hydrotreatment step has as its objective to reduce the content of olefinic and unsaturated compounds as well as to hydrotreat the oxidized compounds (which are for the most part alcohol compounds) that are present in the liquid hydrocarbons of the heavy and light fractions.

In the hydrotreatment step HDT, the liquid hydrocarbons of the heavy and light fractions obtained from the Fischer-Tropsch synthesis step are brought into contact in the presence of hydrogen and a hydrotreatment catalyst at operating temperatures and pressures that make it possible to carry out the hydrodeoxygenation (HDO) of the oxidized compounds and the hydrogenation of olefins present in the feedstock. In general, the hydrotreatment step is carried out in a fixed-bed reactor.

The operating conditions of the contact with the hydrotreatment catalyst can be as follows. The reaction temperatures used in the hydrotreatment reactor are between 100 and 450° C., preferably between 150 and 430° C., and even preferably between 150 and 380° C. The total pressure range used varies between 0.5 and 15 MPa (5 to 150 bar), preferably between 1 and 10 MPa (10 and 100 bar), and in an even more preferred manner between 1 and 9 MPa (10 and 90 bar). The hydrogen that supplies the hydrotreatment reactor is introduced at a flow rate such that the volumetric ratio of hydrogen in relation to hydrocarbons is between 100 to 3,000 Nl/l/h (normal liter of hydrogen per liter of feedstock of hydrocarbons and per hour), preferably between 100 and 2,000 Nl/l/h, and in an even more preferred way between 250 and 1,500 Nl/l/h. The flow rate of the feedstock is such that the hourly volumetric flow rate (defined as being the ratio of the flow rate of hydrocarbon feedstock—i.e., the mixture of light and heavy hydrocarbon fractions—at ambient temperature and pressure to the volume of catalyst) is between 0.1 and 10 h$^{-1}$, preferably between 0.2 and 5 h$^{-1}$, and in an even more preferred manner between 0.2 and 3 h$^{-1}$. Under these conditions, the content of unsaturated and oxidized molecules is reduced preferably to less than 0.5% by weight in the effluent that is obtained from the step HDT, and even to less than 0.1% by weight.

The hydrotreatment step is preferably non-converting, i.e., it is possible to select the operating conditions in such a way that the conversion of the hydrocarbon fraction having a boiling point higher than 370° C. into a hydrocarbon fraction having a boiling point lower than 370° C. is less than 20% by weight, preferably less than 10% by weight, and in a very preferred manner less than 5% by weight.

To carry out the hydrotreatment step HDT, non-cracking or sparingly cracking hydrotreatment substrate catalysts are selected. The hydrotreatment catalyst can comprise at least one metal of group VIIIB and/or group VIB of the periodic table, and can comprise at least one substrate.

Preferably, the catalyst comprises at least one metal of the metal group formed by nickel, molybdenum, tungsten, cobalt, ruthenium, palladium, and platinum, and comprises at least one substrate. It is possible to use a combination of at least one metal of group VIB (in particular molybdenum or tungsten) and at least one metal of group VIIIB (in particular cobalt and nickel). Preferably, a catalyst comprising nickel and molybdenum and comprising at least one substrate is used.

The substrate of the catalyst can be selected from among a substrate that is composed of, and even consists of, alumina or silica-alumina, or boron oxide, or magnesia, or zirconia, or titanium oxide, or a clay or a combination of these oxides. Preferably, the substrate consists of an alumina, preferably eta-alumina or gamma-alumina.

These catalysts can be prepared by any of the methods known to one skilled in the art or else can be acquired with companies specialized in the manufacture and sale of catalysts.

The concentration of metal of the non-noble group VIIIB, expressed in terms of weight of metal oxide in relation to the total weight of catalyst, when the latter is used, is between 0.01 and 15%. The total concentration of metals of groups VIB and VIIIB, when the latter are used, expressed in terms of weight of metal oxide in relation to the total weight of catalyst, is between 5 and 40%, and preferably between 7 and 30%. The ratio by weight expressed in terms of oxide of metal (or metals) of group VIB to metal (or metals) of group VIIIB is between 1.25 and 20, and preferably between 2 and 10. In the case of the use of noble metals (platinum and/or palladium), the content of noble metals, expressed in terms of weight of metal in relation to the total weight of the catalyst, is between 0.05 and 3%, and preferably between 0.1 and 2%.

The hydrotreatment catalyst can advantageously contain phosphorus. Actually, this compound provides two advantages to the hydrotreatment catalysts: an ease of preparation during in particular the impregnation of solutions of nickel and molybdenum, and a better hydrogenation activity. Advantageously, if there is phosphorus in the hydrotreatment catalyst, the concentration of phosphorus oxide $P_2O_5$, expressed in terms of weight of phosphorus oxide $P_2O_5$ in relation to the weight of the catalyst, is less than 15% by weight and preferably less than 10% by weight.

It is also possible to use a catalyst that contains boron and phosphorus. Advantageously, boron and phosphorus are promoter elements deposited on the substrate, as mentioned in the patent EP-297,949. The sum of the amounts of boron and phosphorus, expressed respectively in terms of weight of boron trioxide and phosphorus pentoxide, in relation to the substrate weight, is approximately 5 to 15%, and the atomic ratio of boron to phosphorus is approximately 1:1 to 2:1, and at least 40% of the total pore volume of the finished catalyst is contained in pores with a mean diameter of greater than 13 nanometers. In a preferred way, the amount of metal of group VIB, such as molybdenum or tungsten, is such that the atomic ratio of phosphorus to metal of group VIB is from approximately 0.5:1 to 1.5:1; the amounts of metal of group VIB and metal of group VIIIB, such as nickel or cobalt, are such that the atomic ratio of the metal of group VIIIB to metal of group VIB is from approximately 0.3:1 to 0.7:1. The amounts of metal of group VIB expressed in terms of weight of metal oxides in relation to the weight of the finished catalyst is from approximately 2 to 30%, and the amount of metal of group VIIIB expressed in terms of weight of metal oxides in relation to the weight of finished catalyst is from approximately 0.01 to 15%.

The hydrotreatment catalyst can advantageously contain promoter silicon deposited on the substrate. For example, it is possible to use a hydrotreatment catalyst comprising BSi or PSi.

Preferably, it is possible to select a hydrotreatment catalyst comprising Ni and Mo on a substrate that is composed of, preferably consists of, alumina, or a catalyst comprising Ni and Mo on a substrate that is composed of, preferably consists of, alumina doped with boron and phosphorus, or a catalyst comprising Ni and Mo on a substrate that is composed of, preferably consists of, silica-alumina. Advantageously, the alumina that composes the substrate is selected from among eta-alumina or gamma-alumina.

The hydrotreatment step HDT makes it possible to produce an effluent comprising a gas fraction and a liquid fraction. The entire effluent, i.e., the gas fraction, composed of hydrogen for the most part and oxidized compounds such as carbon monoxide, carbon dioxide and water obtained from the decomposition of oxidized compounds contained in the feedstock, and the liquid fraction, can be sent directly to the hydrocracking and hydroisomerization step via the pipe 5.

Hydrocracking and Hydroisomerization Step

It is possible to carry out a step HCK-HIS for hydrocracking and hydroisomerization of the effluent coming in via the pipe 5 from the hydrotreatment step HDT.

The hydrocracking and hydroisomerization step has as its objective the increase in yield of middle distillates, kerosene and diesel fuel, by selective conversion of the fraction having a boiling point higher than 370° C. into a hydrocarbon fraction having a boiling point of between 120° C. and 370° C., and the enhancement of properties of the middle distillates produced by the isomerization of the effluent entering into the step and heavily composed of normal paraffins. To do this, in the hydrocracking and hydroisomerization step HCK-HIS, the liquid hydrocarbons of the effluent coming in via the pipe 5 are brought into contact in the presence of hydrogen, and a hydrocracking and hydroisomerization catalyst, at temperatures and at operating pressures making it possible to carry out the conversion per pass of products with boiling points higher than or equal to 370° C. into products having boiling points lower than 370° C., is greater than 80% by weight, and in an even more preferred way at least 85% by weight, preferably greater than 88% by weight, in such a way as to obtain middle distillates (diesel fuel and kerosene) having cold properties that are good enough (flow point, freezing point) to meet the specifications in force for this type of fuel. The product of the hydrocracking and hydroisomerization step is evacuated from the HCK-HIS unit via the pipe 6.

In general, the hydrocracking and hydroisomerization step is carried out in a reactor, for example a fixed-bed reactor.

The operating conditions of the contact with the hydrocracking and hydroisomerization catalyst can be as follows. The temperature is between 200 and 450° C., and preferably from 250° C. to 450° C., advantageously from 300 to 450° C., and even more advantageously higher than 320° C., or, for example, between 320 and 420° C. The pressure is generally between 0.2 and 15 MPa (2 and 150 bar), and preferably between 0.5 and 10 MPa (5 and 100 bar) and advantageously between 1 and 9 MPa (10 and 90 bar). The volumetric flow rate (defined as being the ratio of the hydrocarbon feedstock flow rate—i.e., the hydrocarbon effluent coming in via the pipe 5—at ambient temperature and pressure to the volume of catalyst) is between $0.1\ h^{-1}$ and $10\ h^{-1}$, and preferably between $0.2\ h^{-1}$ and $7\ h^{-1}$, and advantageously between $0.5\ h^{-1}$ and $5.0\ h^{-1}$. The hydrogen that supplies the hydrotreatment reactor is introduced at a flow rate such that the volumetric ratio of hydrogen in relation to hydrocarbons is between 100 and 2,000 normal liters of hydrogen per liter of feedstock and per hour, and preferably between 150 and 1,500 liters of hydrogen per liter of feedstock and per hour.

The catalysts used in this hydrocracking and hydroisomerization step are known to one skilled in the art, and an example is described in the document U.S. Pat. No. 7,404,890. They are generally of the bifunctional type combining an acid function with a hydrogenating function.

More specifically, the hydrocracking and hydroisomerization catalysts are preferably bifunctional catalysts comprising an amorphous acid substrate and a hydro-dehydrogenating metal function ensured by at least one noble metal, and more particularly by platinum and/or palladium, preferably platinum.

The hydrocracking and hydroisomerization catalyst used during the HCK-HIS step advantageously comprises at least one hydro-dehydrogenating metal selected from the group formed by the metals of group VIB and group VIIIB of the periodic table and at least one substrate, with the substrate able to be composed of a Bronsted acid solid, i.e., a solid that can release one or more protons, and optionally a binder.

Preferably, said hydrocracking and hydroisomerization catalyst comprises either at least one noble metal of group VIIIB selected from among platinum and palladium, taken by itself or in a mixture, preferably platinum, active in the reduced form thereof, or at least one non-noble metal of group VIIIB, selected from among nickel and cobalt in combination with at least one metal of group VIB, selected from among molybdenum and tungsten, taken by itself or in a mixture, and preferably used in the sulfurized form thereof.

The acid function of the substrate can be provided by large-surface substrates (generally 150 to 800 $m^2 \cdot g^{-1}$) having a surface acidity. The substrate can be composed of at least, and even can consist of at least, one of the following elements: halogenated alumina (for example, chlorinated alumina or fluorinated alumina), phosphorus alumina, a combination of boron and aluminum oxides, silica-alumina, zeolite, or a mixture of zeolite and alumina. In the case where the substrate comprises, and even consists of, zeolite, the zeolite can be selected from among the Y zeolite and the IZM-2 zeolite. Preferably, the substrate is selected from among a silica-alumina, or a mixture of alumina and zeolite, with the zeolite being selected from among the Y zeolite and the IZM-2 zeolite.

In the case where said hydrocracking and hydroisomerization catalyst comprises at least one noble metal of group VIIIB, the noble metal content, expressed in terms of % by weight of noble metal in relation to the total weight of said catalyst, is advantageously between 0.01 and 5%, in a preferred manner between 0.05 and 4%, and in a very preferred manner between 0.10 and 2%.

In the case where said hydrocracking and hydroisomerization catalyst comprises at least one metal of group VIB in combination with at least one non-noble metal of group VIIIB selected from among nickel and cobalt, the metal content of group VIB of said catalyst, expressed in terms of weight of metal oxide in relation to the total weight of the catalyst, is advantageously between 5 and 40%, in a preferred manner between 10 and 35%, and the metal content of group VIIIB of said catalyst, expressed in terms of weight of metal oxide in relation to the total weight of the catalyst, is advantageously between 0.5 and 10%, in a preferred manner between 1 and 8%, and in very preferred manner between 1.5 and 6%.

The metal is advantageously introduced onto the catalyst by any method that is known to one skilled in the art, such as, for example, co-mixing, dry impregnation, or exchange impregnation.

Optionally, a binder can also be used during the step for shaping the substrate of the hydrocracking and hydroisomerization catalyst. A binder is preferably used when the hydrocracking and hydroisomerization catalyst comprises a substrate that is composed of zeolite. Said binder is advantageously selected from among silica ($SiO_2$), alumina ($Al_2O_3$), clays, titanium oxide ($TiO_2$), boron oxide ($B_2O_3$), and zirconia ($ZrO_2$), taken by itself or in a mixture. Preferably, said binder is selected from among silica and alumina and in an even more preferred manner, said binder is alumina, in all of its forms known to one skilled in the art, such as, for example, gamma-alumina.

A preferred hydrocracking and hydroisomerization catalyst comprises, and even consists of, at least one noble metal, with said noble metal being platinum, and the catalyst comprises a substrate selected from among silica-alumina or a zeolite, with or without any binder as described in the preceding paragraph. The silica content of the silica-alumina, expressed in terms of weight of silica in relation to the weight of the substrate of the hydrocracking and hydroisomerization catalyst, is generally between 1 and 95%, advantageously between 5 and 95%, and in a preferred manner between 10 and 80%, and in an even more preferred manner between 20 and 70%, and between 22 and 45%.

The two steps, hydrotreatment HDT and hydrocracking and hydroisomerization HCK-HIS, can be carried out on the two types of catalysts in two or more different reactors, and/or in the same reactor.

Separation Step

It is possible to carry out a step for separating the effluent that comes in from the hydroisomerization and hydrocracking step HCK-ISO via the pipe 6 in such a way as to obtain at least one gas fraction, at least one naphtha fraction, at least one middle distillate fraction, and at least one residual fraction. (The separation step is not shown in FIG. 1.)

The effluent that comes in via the pipe 6 can be sent into a separation means, preferably in a distillation train that integrates an atmospheric distillation and optionally a vacuum distillation, which has as its object to separate the conversion products, with a boiling point of lower than 340° C. and preferably lower than 370° C., from the residual fraction whose initial boiling point is generally higher than at least 340° C. and preferably higher than or equal to at least 370° C. Among the hydroisomerized conversion products, in addition to the C1-C4 light gases, at least one naphtha fraction and at least one kerosene and diesel fuel middle distillate fraction are separated. The residual fraction whose initial boiling point is generally higher than at least 340° C. and preferably higher than or equal to at least 370° C. is preferably recycled in the hydrotreatment step HDT and/or the hydrocracking and hydroisomerization step HCK-ISO.

In the hydrotreatment step HDT and/or the hydrocracking and hydroisomerization step HCK-ISO, it can also be advantageous to recycle a part of the kerosene and/or diesel fuel thus obtained. It goes without saying that the diesel fuel and kerosene fractions are preferably recovered separately, but the fraction points are adjusted by being exploited based on the needs thereof. It was possible to note that it is advantageous to recycle a part of the kerosene to improve its cold properties.

According to the invention, before operating in the production phase of the hydrotreatment step HDT and the hydrocracking and hydroisomerization step HCK-HIS, a specific start-up phase, described below, is carried out. The start-up phase has as its object to minimize the risks of catalytic performance loss linked to the formation of compounds of carbonyl metal type, while controlling the rise in temperature of the catalysts. The start-up phase relates to the hydrotreatment step and optionally the hydrocracking and hydroisomerization step if it is used. Quite obviously, upstream from this start-up phase, the Fischer-Tropsch synthesis unit has been started up and is therefore operational to provide the heavy and light hydrocarbon fractions described above.

According to the invention, the start-up phase of the hydrotreatment step and the hydrocracking and hydroisomerization step is carried out in a series of steps mentioned below. FIG. 2 illustrates the series of steps. This series of steps can be limited only to the steps described below, but it is also possible to refine the start-up phase by adding one or more steps of any type before, or after, or between the steps described below.

Reduction Step RE

A step for reducing catalysts used in the hydrotreatment step HDT and optionally in the hydrocracking and hydroisomerization step HCK-HIS is carried out. The reduction step is carried out by bringing the catalysts into contact with a hydrogen stream at a temperature of between 300 and 500° C., preferably between 400 and 490° C., for example at approximately 450° C. The hydrogen stream can be composed of pure hydrogen or mixed with an inert gas such as nitrogen. The catalyst can be in a fixed bed, for example placed in a reactor used in the hydrotreatment step HDT and/or a reactor used in the hydrocracking and hydroisomerization step HCK-HIS, and the stream of hydrogen flushes the catalyst in the fixed bed. The hydrogen stream can be introduced into the hydrotreatment reactor, and optionally into the hydrocracking and hydroisomerization reactor, with pure hydrogen flow rates of between 100 and 2,000 normal liters per hour and per liter of catalyst, preferably between 300 and 1,500 normal liters per hour and per liter of catalyst. The contact of the catalyst with the hydrogen stream can be carried out during an adequate period, for example between 1 hour and 50 hours, preferably between 2 hours and 10 hours, and even between 2 hours and 5 hours.

At the end of the reduction step, the reduced hydrotreatment catalyst and optionally the hydrocracking and hydroisomerization catalyst is/are cooled to a temperature of between 120° C. and 170° C., preferably between 140° C. and 160° C., for example at a temperature of approximately 150° C. The cooling can be carried out by flushing the catalyst with a gas comprising pure hydrogen, a mixture of hydrogen and inert gas, or an inert gas, for example nitrogen, at a temperature selected to cool the catalyst, for example to a temperature of between 120° C. and 170° C., preferably between 140° C. and 160° C., for example to a temperature of approximately 150° C.

Start-Up Step DM

After having carried out the reduction step RE, the heavy hydrocarbon fraction produced in the Fischer-Tropsch synthesis step FT is introduced into the hydrotreatment unit HDT and then optionally into the hydrocracking and hydroisomerization unit HCK-HIS, if it is used, in the presence of hydrogen. However, unlike with the production phase, during the start-up step, the light hydrocarbon fraction produced by the step FT is not treated in the hydrotreatment step HDT and optionally not in the hydrocracking and hydroisomerization step HCK-HIS. More specifically, the heavy fraction is mixed with a hydrogen stream, and this mixture is brought into contact with the hydrotreatment catalyst used in the hydrotreatment step HDT.

The temperature of the heavy fraction cannot be modified by exiting from the Fischer-Tropsch synthesis step FT before being introduced into the hydrotreatment step HDT. Typically, the temperature of the heavy fraction before being introduced into the hydrotreatment step HDT during the start-up step DM can be between 100° C. and 250° C., and preferably between 120° C. and 200° C.

The effluent obtained from the hydrotreatment step HDT can be mixed with a hydrogen stream, and then this effluent, optionally mixed with a stream of hydrogen, is introduced into the hydrocracking and hydroisomerization step HCK-HIS.

According to the invention, the heavy fraction produced in the Fischer-Tropsch synthesis step FT is therefore brought into contact with a reduced hydrotreatment catalyst having a temperature close to 150° C., but without the presence of the light fraction obtained from step FT. However, taking into account the composition of this heavy fraction, i.e., with the content of oxidized compounds of the heavy fraction being less than that of the light fraction obtained from the Fischer-Tropsch synthesis unit FT, the risk of formation of carbonyl metals during the hydrotreatment step HDT is therefore according to the invention greatly reduced during the start-up step DM. In addition, taking into account the fact that the olefin content of the heavy fraction is small (with the major part of the olefins being present in the light fraction), the start-up of the hydrotreatment step HDT and optionally of the hydrocracking and hydroisomerization step HCK-HIS does not run the risk of thermal superheating because of the hydrogenation of the olefins.

Warming-Up Step TEMP

During the step TEMP, the bringing of the heavy hydrocarbon fraction into contact with the hydrotreatment catalyst is continued. In a manner identical to the step DM, the light hydrocarbon fraction is not brought into contact with the hydrotreatment catalyst.

In the step TEMP, the temperature of bringing the catalyst into contact with the heavy fraction in the hydrotreatment step HDT is increased, for example, to a temperature of between 260° C. and 360° C., preferably between 280° C. and 350° C., for example to a temperature of approximately 300° C.

At the beginning of the warming-up step TEMP, the temperature of the heavy fraction before being introduced into the hydrotreatment step HDT can be between 100° C. and 250° C., and preferably between 120° C. and 200° C.

The rise in temperature can be done gradually, for example over a period of between 1 hour and 20 hours, preferably between 1 hour and 10 hours. The rise in temperature is carried out by heating the heavy fraction in advance before sending it into the hydrotreatment step HDT. For example, the heavy fraction coming in via the pipe 1 is heated, for example in a furnace, at a temperature of between 260° C. and 360° C., preferably between 280° C. and 350° C.

The temperature for bringing the catalyst into contact in the hydrocracking and hydroisomerization step HCK-HIS, if it is implemented, is also increased to a temperature of between 260° C. and 360° C., preferably between 280° C. and 350° C., for example to a temperature of approximately 300° C. The rise in temperature of the catalyst in the hydrocracking and hydroisomerization step HCK-HIS is also done gradually, and in view of the rise in temperature of the catalyst of the hydrotreatment step HDT.

Transition Step TR

After having carried out the warming-up step TEMP, i.e., when the catalyst in the hydrotreatment step HDT has risen to a temperature of between 260° C. and 360° C., preferably between 280° C. and 350° C., for example to a temperature of approximately 300° C., the light fraction produced in the Fischer-Tropsch synthesis step FT is mixed with the heavy hydrocarbon fraction, before injecting the mixture into the hydrotreatment step HDT. The effluent obtained from the hydrotreatment step HDT can then be introduced into the hydrocracking and hydroisomerization step HCK-ISO.

The flow rate of the light fraction mixed with the heavy fraction can be increased gradually by, for example, 0% by volume up to 100% by volume of the light fraction produced in the Fischer-Tropsch synthesis unit. For example, the increase of the flow rate from 0% to 100% by volume can be carried out over a period of between 1 hour and 20 hours, preferably 1 hour and 10 hours.

Then, the operating conditions of the hydrotreatment step HDT and optionally of the hydrocracking and hydroisomerization unit HCK-HIS are modified until reaching the operating conditions of the production phase described above, so as to obtain the desired conversions into oxidized compounds and olefins. Then, the method for producing diesel fuel and kerosene is carried out as described with reference to FIG. 1.

BRIEF DESCRIPTION OF THE DRAWINGS

The example is described with reference to FIG. 1 and to FIG. 2, which represent schematic flows of the process.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1760011, filed Oct. 24, 2017 are incorporated by reference herein.

EXAMPLES

Example According to the Invention

In step FT, the method produces a heavy fraction circulating in the pipe 3 corresponding to Fischer-Tropsch waxes and a light fraction circulating in the pipe 2 corresponding to Fischer-Tropsch condensates. The feedstock has the following characteristics.

TABLE 1

Characteristics of the Feedstock

|  |  | Condensates | Waxes |
|---|---|---|---|
| Density at 15° C. | g/cm3 | 0.7513 | 0.7613 |
| 5.0% | ° C. | 68.9 | 287.1 |
| 20.0% | ° C. | 128.4 | 359.2 |
| 50.0% | ° C. | 217.8 | 431.4 |
| 70.0% | ° C. | 272.8 | 475.2 |
| 95.0% | ° C. | 368.3 | 577.7 |
| 370° C.+ Compound | % by Weight | 4 | 78 |
| Paraffins | % by Weight | 73 | 95 |
| Olefins | % by Weight | 20 | 4 |
| Oxidized Compounds | % by Weight | 7 | 1 |

In step HDT, an NiMo-type hydrotreatment catalyst on an alumina substrate combined with NiO is used. This catalyst is marketed by Axens under the reference HR945.

After having carried out the reduction step RE, the start-up step DM is carried out. The heavy fraction coming in via the pipe 3 is brought into contact with the hydrotreatment catalyst in the presence of hydrogen.

More specifically, the waxes obtained from the Fischer-Tropsch synthesis step FT are sent in a mixture with a hydrogen stream. The mixture is sent at 150° C. The flow rate of hydrogen is adjusted in such a way as to maintain an H2/HC=600 L/L ratio measured exiting from the unit. During this step, the hydrogen makeup is limited taking into account the very low conversion of olefins and oxidized compounds, present in a very small amount.

Next, the warming-up step TEMP is carried out. The temperature for bringing the hydrotreatment catalyst into contact is increased gradually to the temperature required for the hydrotreatment, 335° C.

Once the target temperature is reached, the transition step TR is carried out. The light hydrocarbon fraction, i.e., the condensates, obtained from the Fischer-Tropsch synthesis FT via the pipe 2, is added in a mixture with the heavy hydrocarbon fraction, i.e., the wax, coming in via the pipe 3. The condensates are injected gradually in such a way as to monitor the increase in the temperature linked to the exothermy of the reaction for hydrogenation of olefins.

The operating conditions of the step HDT are then used to obtain 100% hydrogenation of the olefins in the hydrotreatment section. The conditions are:
P=6.5 MPa (65 bar)
T=335° C.
vvh=1 h−1
H2/HC=600 Nl/l/h−1 measured exiting from the unit with a fresh H2 makeup on the order of 10% to 20% by volume of the total H2 flow rate (recycled and fresh H2)

The characteristics of the effluent exiting from the hydrotreatment step HDT are listed in Table 2.

TABLE 2

Characteristics of the Hydrotreated Effluent

| Density at 15° C. | 0.7853 | g/cc |
|---|---|---|
| Sulfur | <Detection Limit | ppm by Weight |
| Nitrogen | <Detection Limit | ppm by Weight |
| Oxygen | 0 | % by Weight |
| n-Paraffins | 85.0 | % by Weight |
| i-Paraffins | 5.68 | % by Weight |
| Naphthenes | 0 | % by Weight |
| Aromatic Compounds | 0 | % by Weight |
| Olefins | 0 | % by Weight |
| Simulated Distillation |  |  |
| 5 | 126.4 | ° C. |
| 20 | 197.8 | ° C. |
| 50 | 319.7 | ° C. |
| 70 | 402.5 | ° C. |
| 95 | 525.3 | ° C. |
| 370° C.+ Compounds | 37 | % by Weight |

The characteristics of the hydrotreated effluent appearing in Table 2 show that the hydrotreatment catalyst does not have any cracking activity. The olefins and the oxidized compounds measured by chromatography are entirely decomposed.

Below, the conversion of the 370° C.+ fraction is defined by the following formula:

Conversion=[(% 370° C.−effluent)−(% 370° C.−feedstock)]/(100−% 370° C.−feedstock)

with:
% of 370° C.−effluents, the fraction by mass of compounds having boiling points lower than 370° C. in the effluents
% of 370° C.−feedstock=fraction by mass of compounds having boiling points lower than 370° C. in the hydrocracking feedstock.

During the hydrocracking and hydrotreatment step HCK-HIS, the target conversion of the 370° C.+fraction is 55% by weight. The adequate operating conditions are:
P=6.5 MPa (65 bar)
T catalyst HCK=363° C.
vvh=2 h−1
H2/HC=600 L/L
Age of the catalyst: 75 days The hydrocracking and hydroisomerization catalyst is used in a fixed bed. A Pt-based catalyst marketed by AXENS on a silica-alumina substrate is used.

It is activated by reduction under hydrogen under the following operating conditions:
Flow rate of pure hydrogen: 1,000 normal liters per hour and per liter of catalyst,
Rise in ambient temperature to 150° C.: 25° C./minute,
One-hour plateau at 150° C.,
Rise from 150° C. to 450° C. at 25° C./minute,
Two-hour plateau at 450° C.

Next, the liquid effluent obtained from the hydrocracking and hydroisomerization step HCK-HIS is fractionated. Thus separated are the gasoline fraction, the kerosene fraction, and the diesel fuel fraction. The 370° C.+fraction exiting from the fractionation is recycled to the step HCK-HIS.

Thus, according to the injection mode as well as the temperature for injection of the feedstock according to the invention into the hydrotreatment unit and the hydrocracking and hydroisomerization unit, there are two means making it possible to reduce the poisoning of the hydrotreatment and hydrocracking and hydroisomerization catalysts and thus to preserve the catalytic performance.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for starting up a method for producing kerosene and diesel fuel from hydrocarbon compounds produced by Fischer-Tropsch synthesis, comprising:
   a) catalytic Fischer-Tropsch synthesis with a synthesis gas to produce a heavy hydrocarbon fraction and a light hydrocarbon fraction,
   b) reduction of a hydrotreatment catalyst by ensuring contact with a gas comprising hydrogen, and then c) is carried out,
   c) contacting the heavy hydrocarbon fraction with the hydrotreatment catalyst,
   d) during c), the temperature of the hydrotreatment catalyst is increased to a temperature of 260° C. to 360° C., and then e) is carried out,
   e) contacting a mixture comprising the heavy hydrocarbon fraction and the light hydrocarbon fraction with the hydrotreatment catalyst.

2. The method according to claim 1, in which
   in b), reduction of the hydrotreatment catalyst and a hydrocracking and hydroisomerization catalyst is carried out by contacting with a gas comprising hydrogen, and then c) is carried out,
   in c), the heavy hydrocarbon fraction is brought into contact with the hydrotreatment catalyst and then with the hydrocracking and hydroisomerization catalyst,
   in e), the mixture comprising the heavy hydrocarbon fraction and the light hydrocarbon fraction is brought into contact with the hydrotreatment catalyst and then with the hydrocracking and hydroisomerization catalyst.

3. The method according to claim 1, in which b) is carried out at a temperature of 300° C. to 500° C., and then the hydrotreatment catalyst is cooled to a temperature of 120° C. to 170° C., and then c) is carried out.

4. The method according to claim 1, in which at the beginning of d), the heavy hydrocarbon fraction is at a temperature of 100° C. to 250° C. and in which in d), the heavy hydrocarbon fraction is heated gradually for a period of 1 to 20 hours to a temperature of 260° C. to 360° C.

5. The method according to claim 1, in which in e), the light fraction is mixed gradually with the heavy fraction, with the portion of light fraction introduced into the mixture being increased from 0% to 100% by volume of the light fraction obtained from a), over a period of 1 to 20 hours.

6. The method according to claim 1, in which during c), the light hydrocarbon fraction is evacuated from the start-up method.

7. The method according to claim 1, in which the hydrotreatment catalyst comprises at least one metal of group VIIIB or group VIB, and at least one substrate.

8. The method according to claim 7, in which the hydrotreatment catalyst comprises molybdenum and nickel, and a substrate comprising alumina.

9. The method according to claim 2, in which the hydrocracking and hydroisomerization catalyst comprises at least one metal of group VIIIB or group VIB, and at least one substrate.

10. The method according to claim 9, in which the hydrocracking and hydroisomerization catalyst comprises platinum and a substrate a silica-alumina or a zeolite.

11. The method according to claim 1, in which a) is carried out, in the presence of a catalyst comprising a substrate and cobalt or iron, at a total pressure of 0.1 to 15 MPa, at a temperature of 150 to 350° C., and at an hourly volumetric flow rate of 100 to 20,000 volumes of synthesis gas per volume of catalyst and per hour.

12. The method according to claim 1, further comprising:
   f) after e), continuing to contact the mixture comprising the heavy hydrocarbon fraction and the light hydrocarbon fraction with the hydrotreatment catalyst under the operating conditions for producing kerosene and diesel fuel.

13. The method according to claim 12, in which the contact with the hydrotreatment catalyst is carried out in f) under the following operating conditions:
   a temperature of 100 to 450° C.,
   a total pressure of 0.5 and to 15 MPa,
   a hydrogen flow rate such that the volumetric ratio of hydrogen in relation to the hydrocarbon feedstock is 100 to 3,000 Nl/l/h,
   an hourly volumetric flow rate of 0.1 to 10 $h^{-1}$.

14. The method according to claim 12, in which in f), the mixture
   comprising the heavy hydrocarbon fraction and the light hydrocarbon fraction continues to be brought into contact with the hydrotreatment catalyst and then with a hydrocracking and hydroisomerization catalyst, with the contact with the hydrocracking and hydroisomerization catalyst being carried out under the following operating conditions:
   a temperature of 200 to 450° C.,
   a total pressure of 0.2 to 15 MPa,
   a hydrogen flow rate such that the volumetric ratio of hydrogen in relation to the hydrocarbon feedstock is 100 to 2,000 Nl/l/h,
   an hourly volumetric flow rate is 0.1 and to 10 $h^{-1}$.

* * * * *